US005410734A

United States Patent [19]

Choi et al.

[11] Patent Number: 5,410,734

[45] Date of Patent: Apr. 25, 1995

[54] QUICK CHARGING BATTERY SAVING CONTROL CIRCUIT AND METHOD FOR A PAGING RECEIVER

[75] Inventors: Jin-Ho Choi; Jong-Yun Shim, both of Suwon, Rep. of Korea

[73] Assignee: SamSung Electronics Co., Ltd., Suwon, Rep. of Korea

[21] Appl. No.: 977,517

[22] Filed: Nov. 17, 1992

[30] Foreign Application Priority Data

Nov. 26, 1991 [KR] Rep. of Korea ............... 21242/1991

Feb. 22, 1992 [KR] Rep. of Korea ................. 2739/1992

[51] Int. Cl.[6] .............................................. H04B 1/16

[52] U.S. Cl. .................................. 455/38.3; 455/343; 340/825.44

[58] Field of Search ..................... 455/31.1, 33.1, 343, 455/207, 314, 38.3; 340/825.44, 825.47, 825.21, 825.48, 311.1; 320/20

[56] References Cited

U.S. PATENT DOCUMENTS 4,506,386 3/1985 Ichikawa et al. .................... 455/343
4,839,639 6/1989 Sato et al. ....................... 340/825.44
5,027,428 6/1991 Ishiguro et al. ...................... 455/343
5,193,212 3/1993 Son ...................................... 455/343

FOREIGN PATENT DOCUMENTS 0091695A 10/1983 European Pat. Off. .
0124788 11/1984 European Pat. Off. .
2136178 9/1984 United Kingdom .
2136179 9/1984 United Kingdom .
WO91/19357 12/1991 WIPO ................................ 455/343

*Primary Examiner*—Reinhard J. Eisenzopf
*Assistant Examiner*—Thanh Le
*Attorney, Agent, or Firm*—Robert E. Bushnell

[57] ABSTRACT

A quick charging control circuit of a paging receiver and a control method thereof for minimizing introduction of error during reception of data by differently controlling the operation of a quick charging circuit in response to a data transmission or reception state. The quick charging control circuit of a paging receiver having a battery, a radio frequency (RF) receiving circuit, a waveform shaping circuit with a charging circuit and a quick charging circuit includes preamble detecting and synchronization code detectors for respectively detecting a preamble signal and a synchronization code among data generated from the waveform-shaping circuit, a data processor for processing batch data among the data generated from the waveform-shaping circuit, and switch controller for providing the battery saving signal to the RF receiving circuit and waveform-shaping circuit and for providing the quick charge signal to the quick charging circuit by switching the voltage of the battery with a period of a first operating state for, detecting first and second predetermined codes, and controlling an output period of the battery saving signal and the quick charge signal with a second operating state for detecting a third predetermined code in response to outputs of the preamble and synchronization code detector.

15 Claims, 8 Drawing Sheets

QUICK CHARGING BATTERY SAVING CONTROL CIRCUIT AND METHOD FOR A PAGING RECEIVER

CROSS REFERENCE TO RELATED APPLICATIONS

This application makes reference to, and claims the benefits provided under 35 U.S.C. §119 arising from an application earlier filed in The Korea Industrial Property Office on 26 Nov. 1991 and assigned Serial No. 1991/21242, and an application earlier filed in The Korea Industrial Property Office on 22 Feb. 1992 and assigned Serial No. 1992/2739, copies of which applications are attached hereto and incorporated into this application.

BACKGROUND OF THE INVENTION

The present invention relates to a quick charging control circuit of a paging receiver and to a process for controlling quick charging of a paging receiver, and more particularly, to a charging control circuit and a process for minimizing occurrence of error during reception of broadcast data by relying upon different operational steps for regulating a quick charging control circuit respectively in response to states of data received.

Generally in contemporary designs, since a paging receiver is operated with the voltage provided by a battery, it has a battery saving circuit for minimizing power consumption by periodically, rather than continuously, supplying power to a radio frequency (RF) receiving circuit.

Typically, contemporary designs of paging receivers contemplate use of a capacitor with a large capacitance, for shaping the waveform of a received radio frequency signal. That capacitor is connected either in series or in parallel, to an input terminal receiving a radio frequency signal. Charging and discharging of the capacitor occurs in response to a battery saving signal, and necessary data can not be reliably obtained from the radio frequency signal with a dependable modicum of accuracy during the charge time constant of the charging stage of the circuit while the capacitor is being charged. Consequently, contemporary designs also rely upon a quick charging circuit for charging the capacitor over a shorter time than the time constant of the charging stage commonly used in the waveform-shaping circuits. Moreover, since the waveform-shaping circuit has a low-pass filter for producing a reference voltage, sufficient time is required for charging the capacitor to raise the amplitude of the reference voltage to correspond to an intermediate voltage of the low pass filter. Therefore, in contemporary designs of paging receivers, the battery saving circuit is periodically operated before a self-identification data frame signal is received; that is, the battery saving circuit is operated with a shorter period than the time constant of the low pass filter. If power is provided to the entire circuit before the self-identification data frame signal is received, unnecessary power is supplied to the parts of the circuit other than the waveform shaping stage for producing the reference voltage, thereby lowering power consumption efficiency. In order to improve such inefficient power consumption, more recent designs of receivers suggest that when first supplied, the reference voltage of the waveform-shaping circuit be applied separately to the radio frequency receding circuit and to the waveform-shaping circuit. An example of such a quick charging control circuit is disclosed by way of example, in U.S. Pat. No. 4,479,261 issued on 23 Oct. 1984 to Taksaki Oda and Takeshi Nakajima.

In operational use of contemporary paging receivers however, if the code length of transmitted data is very long, it is difficult to continually maintain the charged voltage while the entire code length is being received, and an error may consequently be introduced into the data received due to a gradual drop in the charged voltage during the prolonged period required for receiving the transmitted data. In addition, with the typical contemporary paging receiver, if the main power of the receiver is turned off, and consequently the capacitor is fully discharged, even after the main power of the receiver is again turned on, substantial time (i.e., due to the capacitor charging interval) is required before the circuit is able to resume operation. Consequently, an error may be introduced into the data received during the capacitor charging interval immediately after the main power has been turned on.

SUMMARY OF THE INVENTION

Accordingly, it is an object of the present invention to provide an improved circuit and process for controlling application of battery power to a pager receiver.

It is another object to provide a circuit and process capable of minimizing errors during reception of data by controlling power and quick charging of the received signal process circuit during first and second operating states representative of data transmission states.

It is yet another object to provide a circuit and a control process for supplying power only when a preamble code, a synchronization code and a self-identification frame data signal are detected.

It is still another object to provide a circuit and central process for implementing different schemes for providing power to a receiver in dependence upon the component of a broadcast signal anticipated.

It is a further object of the present invention to provide a circuit and a control process for preventing introduction of an error into data received by maintaining a charged reference voltage when a quick charging circuit is used, even if data is received over an extended interval.

It is still yet further object of the present invention to provide a circuit and a control process for raising the accuracy of detection of self-identification data and reducing unnecessary power consumption.

These and other objects may be achieved according to one aspect of the present invention, in order to minimize power consumption, in an embodiment constructed according to the principles of the present invention with a receiving unit that is turned on and off with a period of a first operating state. When the receiving unit is turned on, if a first predetermined code (e.g., a preamble signal) is received, a paging receiver receives only necessary data in response to a given paging receiver code system with a second operating state. That is, data received through a waveform-shaping circuit is analyzed, to see whether the first predetermined code (i.e., the preamble signal) or a second predetermined code (e.g., a synchronization code) is detected, and the receiving unit is turned on and off in response to the code system as determined by the reception of the first or second predetermined codes, thereby minimizing power consumption. Since the receiving unit is turned on and off during the first operating state, a capacitor in the waveform-shaping circuit is charged and discharged. Consequently, if the receiving unit is tuned on after the capacitor is fully discharged, the waveform-shape is not formed until a reference voltage necessary for the waveform-shape is obtained. If the transmission speed of data becomes faster or the capacitance of the capacitor is increased, several bits of data could be lost. Therefore, after detecting the first or second predetermined code during the first operating state, the capacitor in the waveform-shaping circuit is charged during a second operating state at a faster rate, thereby reducing the risk of introduction of error into the data received.

In accordance with another aspect of the present invention, when shaping the waveform of a radio frequency signal is received, a quick charge is not performed if self identification data is present after detection of a preamble signal, so that an intermediate voltage of a low pass filter in the waveform shaping stage and a reference voltage of a voltage comparator determined by charging and discharging the intermediate voltage, will be equal to each other.

BRIEF DESCRIPTION OF THE DRAWINGS

For a better understanding of the invention and to show how the same may be carried into effect, reference will now be made, by way of example only, to the accompanying diagrammatic drawings, in which.

DETAILED DESCRIPTION OF THE PREFERRED EMBODIMENT

Figure 1:
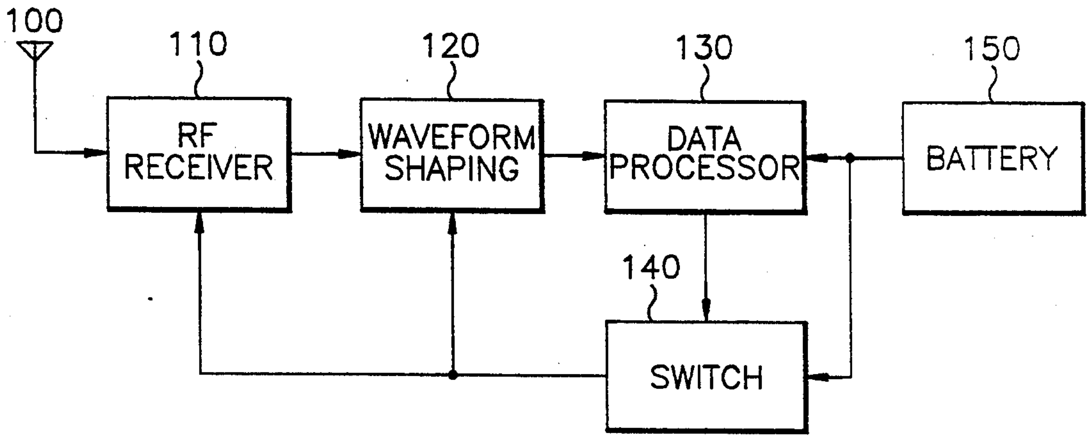
(PRIOR ART) FIG. 1
FIG. 1 is a block diagram representing a conventional paging receiver.

Turning now to the drawings, FIG. 1 is a block diagram of a conventional paging receiver having a battery saving circuit. A radio frequency receiving circuit 110 converts a signal picked up by an antenna 100 into a baseband signal, and a waveform-shaping circuit 120 waveform-shapes the baseband signal generated from the RF receiver circuit 110 into a logic signal having a given amplitude. A data processing circuit 130 generates a battery saving signal BS in response to a transmission code format and analyzes data produced from the waveform-shaping circuit 120 to provide a buzzer tone, and to display data. In response to the battery saving signal BS, a switching circuit 140 supplies the voltage of a battery 150 to the RF receiving circuit 110 and to waveform-shaping circuit 120. That is, a signal received through the antenna 100 is converted into a baseband signal in the RF receiving circuit 110, and is waveform-shaped into a logic input signal of the data processing circuit 130 through the waveform shaping circuit 120. The data processing circuit 130 processes received data to generate the buzzer tone and the display of data.

Figure 2:
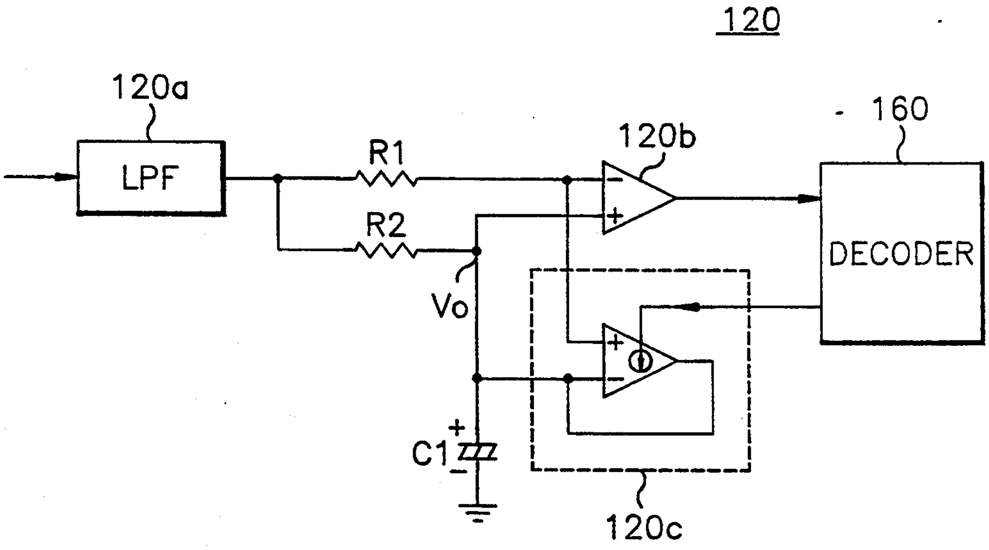
(PRIOR ART) FIG. 2
FIG. 2 is a schematic circuit diagram of a waveform-shaping circuit of the type frequently included within the receiver represented in FIG. 1.

A schematic circuit diagram of a typical example of waveform shaping circuit 120 is represented by FIG. 2. Data processing circuit 130 has a battery saving function producing the battery saving signal BS for minimizing consumption of energy from the battery by regulating the switching circuit 140, thereby enabling minimal supply of power in response to reception of a signal in the worldwide exclusive POCSAG (Post Office Code Standardization Advisory Group) code format. The operation of the illustrated battery saving circuit is disclosed, for example, in the aforementioned U.S. Pat. No. 4,479,261 to Oda et al.

Figure 9:
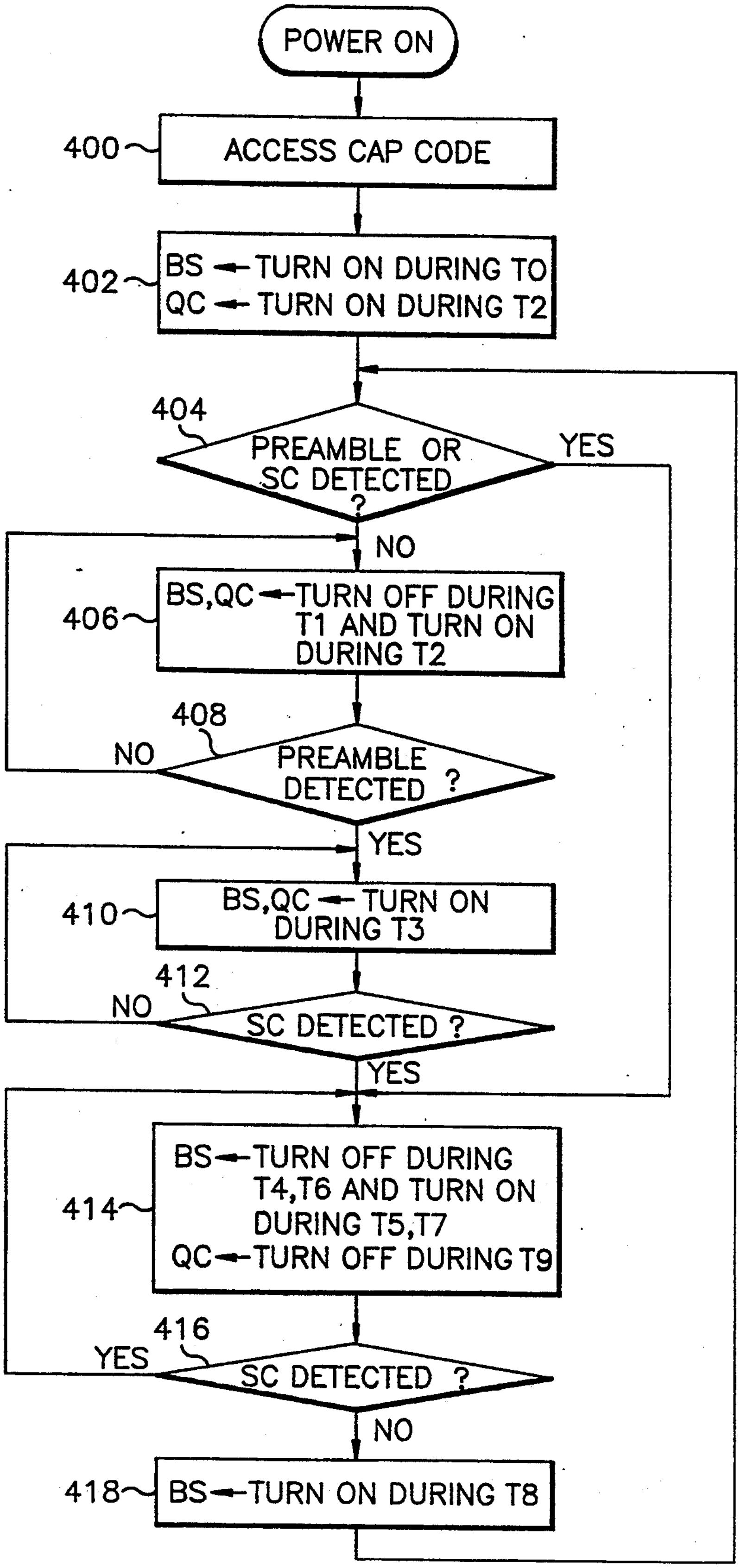
FIG. 9 is a flowchart showing charging control steps for a second embodiment operated according to the present invention.

As shown in the waveform-shaping circuit 120 of FIG. 9 the paging receiver of FIG. 1 has a capacitor C1 with a large capacitance for contributing to the shaping of the waveform that has been provided by radio frequency receiver circuit 110. Capacitor C1 may be connected in series or in parallel to an input terminal of the operational amplifier **120*b* forming with resistors R1, R2, a voltage comparator stage receiving an RF signal from low pass filter 120*a* via resistor R2. Therefore, charging and discharging of capacitor C1 is dependent upon the battery saving signal BS, and essential data can not be obtained from the radio frequency signal received during a charge time constant determined by resistor R2 and capacitor C1. Consequently, a quick charging circuit 120*c* for charging capacitor C1 within a shorter time than the time constant attributable to resistor R2 and capacitor C1 is preferably used in the waveform-shaping circuit. Moreover, since the waveform-shaping circuit 120 has a low-pass filter (LPF) 120*a* for producing a reference voltage, a comparatively large time constant is required for the filter in order to stabilize the amplitude of the reference voltage. Therefore, in the paging receiver, the battery saving circuit is periodically operated before a self-identification data frame signal is received, that is, with a shorter period than the time constant of the low pass filter. If power is provided to the entire circuit before the self data frame signal is received, unnecessary power is supplied to the parts of the circuit other than the stage for producing the reference voltage as represented by waveform-shaping circuit 120, thereby lowering power consumption efficiency. In order to improve such inefficient power consumption, the reference voltage $V_o$ of the waveform-shaping circuit 120 is first supplied by separating the power applied to the RF receiving circuit 110 and the waveform-shaping circuit 120**. An example of such a quick charging control circuit is disclosed by way of example, in U.S. Pat. No. 4,479,261 to Oda et al.

In conventional paging receiver, if the coded length of transmitted data is longer than normal, it is difficult to constantly maintain the charged voltage, and an error may consequently be introduced in the data received due to a gradual drop in the charged voltage during a prolonged period required for receiving the data. In addition, if the main power of the receiver has been turned off, and as a result, the capacitor is fully discharged, even after the main power of the receiver is again turned on, a delay longer than the capacitor charging time constant is required before the circuit is able to resume normal operation. That is, an error is likely to be introduced into the data received immediately after the main power is again turned on.

Figure 3:
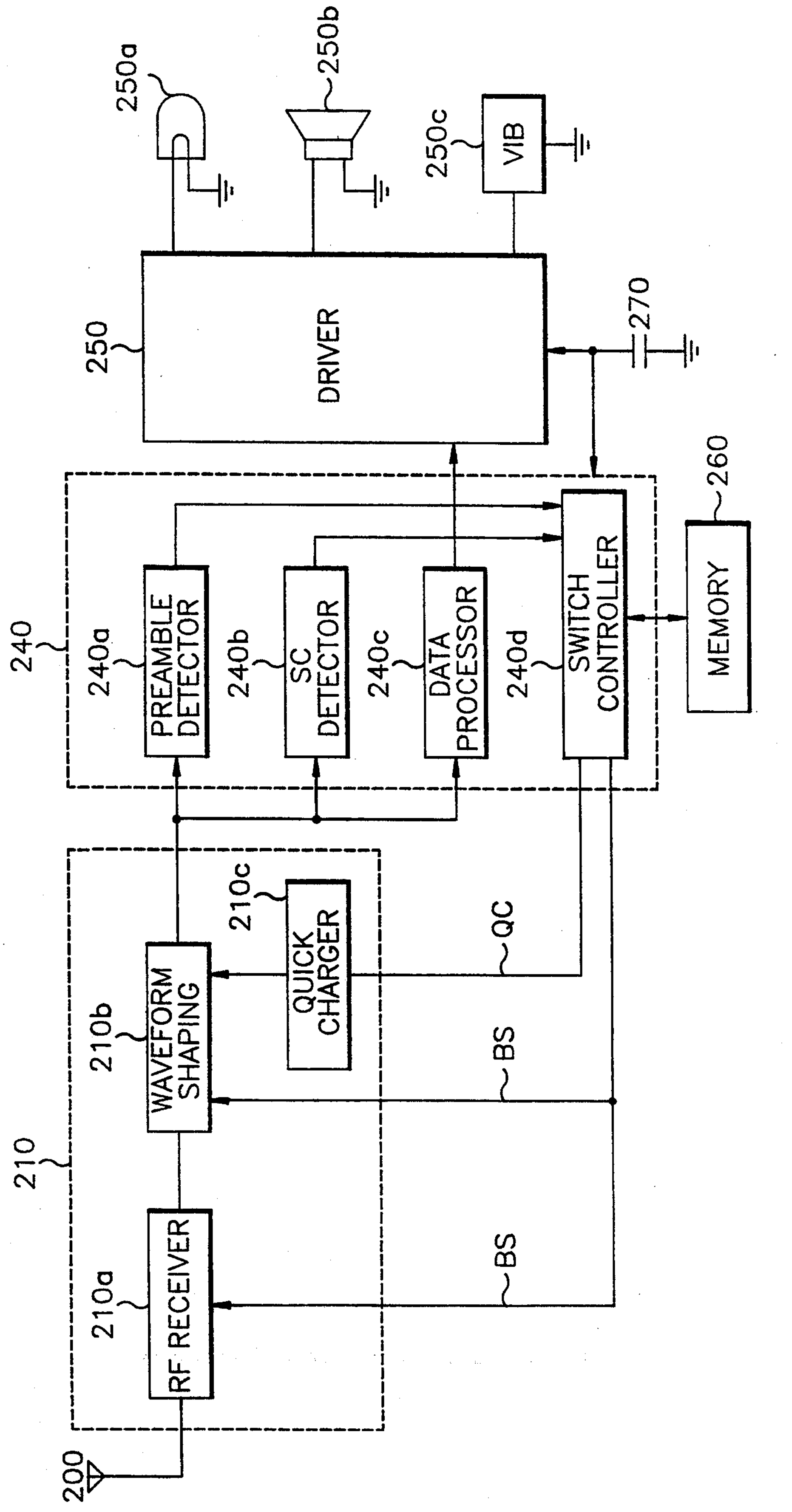
FIG. 3 is a block diagram of a paging receiver constructed according to the principles of the present invention.

Referring now to FIG. 3, receiving unit 210 such as a personal radio frequency paging receiver, includes the RF receiving circuit 210*a*, waveform-shaping circuit 210*b* and the quick charging circuit 210*c*. In response to battery saving signal BS, radio frequency receiving circuit 210*a* demodulates a signal received from antenna 200, into a baseband signal. A waveform-shaping circuit 210*b* has a charging stage producing a reference voltage $V_o$ when charged to a given input level. Shaping circuit 210*b* compares the baseband signal with the reference voltage $V_o$ in response to the BS signal to generate a waveform-shaped signal. A quick charging circuit 210*c* quickly charges to the reference voltage $V_o$ of the waveform-shaping circuit 210*b* in response to a quick charge control signal QC. A preamble detector 240*a* and a synchronization code (SC) detector 240*b* operated by voltage of the battery 270, respectively detect a preamble signal and a synchronization code among data of the waveform-shaped signal produced from the waveform shaping circuit 210*b*. A data processor 240*c* is operated by the voltage of the battery 270 and processes batch data among the data of the waveform-shaped signal generated from the waveform-shaping circuit 210*b*. Waveform shaping circuit 120*b* may be constructed with low pass filter 120*a* and voltage comparator 120*b*, while quick charge circuit 210*c* may be constructed with charging stage 120*c*, shown in FIG. 2.

A battery 270 provides a voltage $V_b$ of a given level to controlling unit 240 and peripheral driver 250. Controlling unit 240 includes preamble detector 240*a*, synchronization detector 240*b*, data processor 240*c* and switch controller 240*d*. Controlling unit 240 may, in a particular embodiment, be constructed with a one chip, four-bit microprocessor. Preamble detector 240*a* and synchronization code (SC) detector 240*b* are powered by the voltage $V_b$ provided by battery 270, to respectively detect preamble signal and a synchronization code signal components among data of the waveform-shaped signal produced from the waveform shaping circuit 210*b*. Data processor 240*c* is also powered by the voltage of the battery 270 to process batch data among the data of the waveform-shaped signal provided by waveform-shaping circuit 210*b*. Switch controller 240*d* provides battery saving signal BS to the RF receiving circuit 210*a* and to waveform-shaping circuit 210*b*, and provides quick charge signal QC to quick charging circuit 210*c* by switching the voltage of battery 270 at a period for a first operating state while detecting first or second predetermined code components of the waveform-shaped signal provided by shaping circuit 210*b*. Switch controller 240*d* also controls the output period of the battery saving signal BS and quick charging QC signal in a second operating state for detecting a third predetermined code in response to outputs of preamble detector 240*a* and the synchronization code detector 240*b*. The peripheral driving unit 250 selectively drives a lamp 250*a*, a speaker 250*b* and a vibrator 250*c*, in response to the output of batch data processor 240*c*. A memory 260, for example a ROM (i.e., read-only memory) stores CAP (i.e., customer administration panel) code data.

Figure 4:
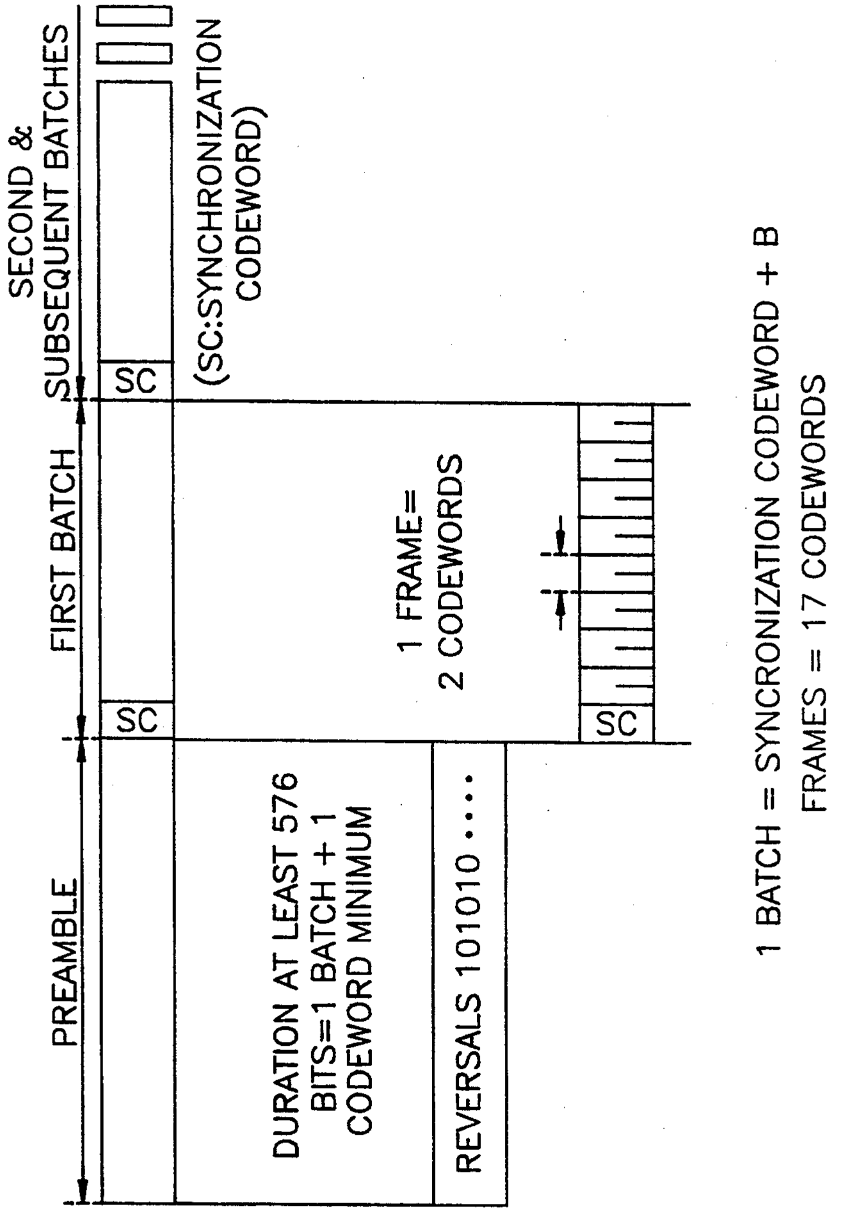
FIG. 4 is a diagram showing a POCSAG code format applied in accordance with the principles of the present invention.

FIG. 4 illustrate the format of the POCSAG code, which is the exclusive signal format for paging receivers currently used throughout the world, and it is also the signal format specified in CCIR Recommendation No. 584. The POCSAG code includes a preamble signal and a plurality of batches of data, with each of the batches having one synchronization code word SC and eight frames. The preamble signal component detected from a received signal, is used for synchronizing a clock with the received signal. The preamble signal may be called a "first predetermined code". The synchronization code word SC is used to adjust the word synchronization of a code word signal such as an address, message or idle cord code signal being transmitted next, and may be called a "second predetermined code". The first predetermined code, is an inverse signal of 101010 and contains at least five hundred and seventy-six bits transmitted at a speed of five hundred and twelve bits per second according to the POCSAG standard (CCIR 584) to operate a battery saving circuit. With a battery saving signal BS of a given period (for example, sixty-four bits turning on and five hundred and twelve bits turning off, or thirty-two bits on and five hundred and forty-four bits off) supplied to RF receiving circuit 210*a* and waveform-shaping circuit 210*b*, RF receiver 210 can receive the first predetermined code. The POCSAG code is arranged in a batch structure formed with a synchronization code (a second predetermined code) of thirty-two bits, and eight frames each having an address code word of thirty-two bits and a message code word of thirty-two bits. That is, the batch structure is composed of each batch having seventeen code words (that is, one synchronization code word, eight address code words, and eight message code words) each of thirty-two bits. Second and subsequent batches may follow the first batch component of the POCSAG code format. It may be assumed that a self-identification frame having an identification address is a "third predetermined code".

Figures 5A, 5B, 5C, 5D:
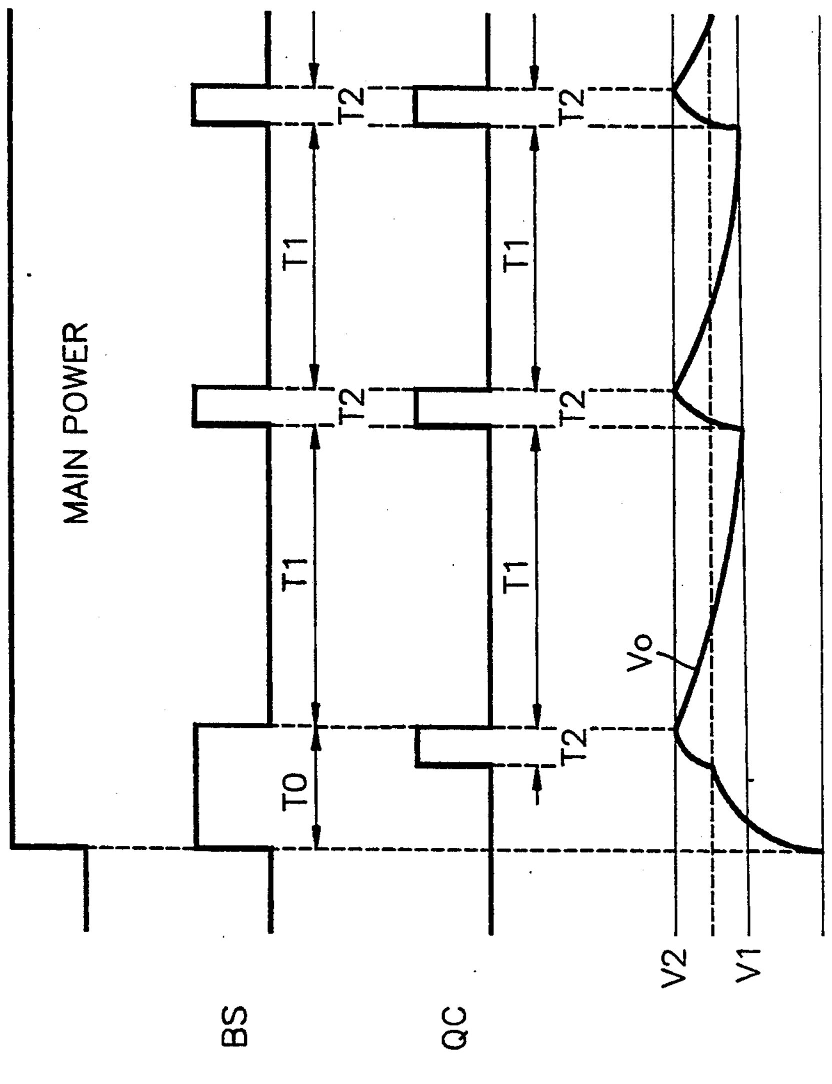
FIGS. 5A through 5D are operational waveforms of a first operational state characteristic of a first embodiment of the present invention.

FIGS. 5A to 5D illustrate several of the operational waveforms describing a first operational state of an embodiment such as that shown in FIG. 3. FIG. 5A show the amplitude of the voltage, $V_b$, of the main power provided by battery 270, while FIGS. 5B and 5C respectively show battery saving signal BS and quick charging signal QC in relation to the amplitude of the voltage of the main power. FIG. 5D shows that the amplitude of reference voltage $V_o$ is responsive to battery saving signal BS and quick charging signal QC when the main power of the paging receiver is turned on and no POCSAG broadcast signal is received via antenna 200.

FIGS. 6A to 6D illustrate operational waveforms for use in describing a second operational state, and there are shown operational states in response to a transmitted signal when the receiving unit 210 of the paging receiver is periodically turned on or off by battery saving signal BS and quick charge signal QC during the first operating state while detecting the preamble signal or synchronization code signal SC.

Figure 7:
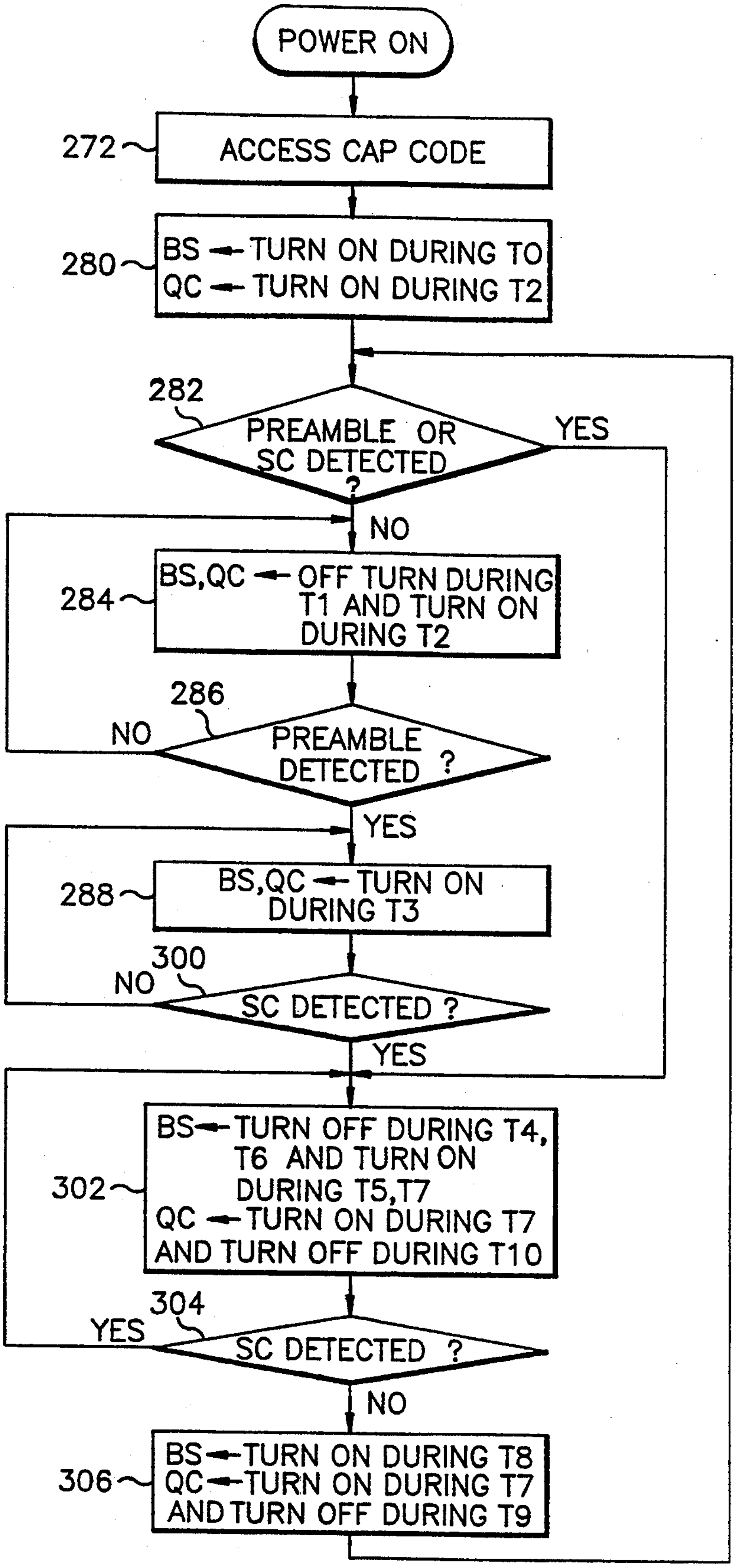
FIG. 7 is a flowchart showing charging control steps for a first embodiment operated according to the principles of the present invention.

FIG. 7 is a flowchart showing quick charge control steps suitable for controlling operation of the paging receiver of FIG. 3.

Figures 8A, 8B, 8C, 8D:
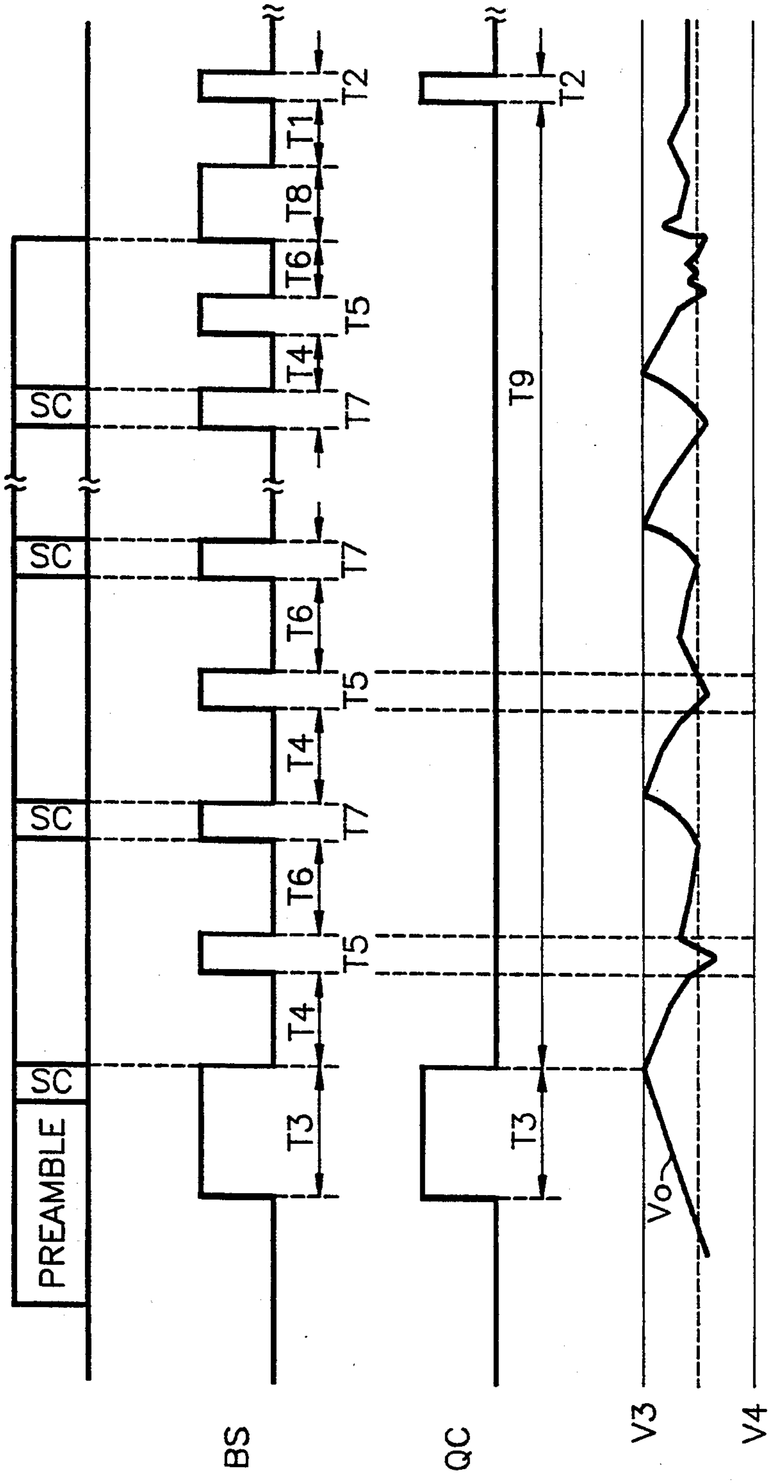
FIGS. 8A through 8D are operational waveforms characteristic of a second embodiment of the present invention.

FIG. 8A shows the POCSAG code system when a self data frame is detected, and FIGS. 8B to 8D show operational waveforms of the battery saving signal BS and quick charge signal QC, in relation to the amplitude of the reference voltage Vo during charging by capacitor C1 in the waveform-shaping circuit 210*b* when there is a self data frame.

FIG. 9 is a flowchart showing an alternate operational process for the quick charge control steps of the paging receiver of FIG. 3.

The operational process of quick charge control according to a first embodiment of the present invention will now be described in detail with reference to FIGS. 2 through 7.

If the main power of the paging receiver is turned on as is shown in FIG. 5A, switch controller 240*d* in the controlling unit 240 accesses data (e.g., a CAP code) stored in memory 260 in step 272 of FIG. 7. In step 280, the switch controller 240*d* supplies the battery saving signal BS and quick charging signal QC respectively having periods T0 and T2 as shown in FIGS. 5B and 5C, to the RF receiving circuit 210*a* and the quick charging circuit 210*c* respectively, by switching the power of the battery 270 on the basis of control data read from memory 260 in step 280. In this case, the period T2 is determined by the on/off ratio for detecting the second predetermined code (SC code) of thirty-two bits, or at least thirty-two bits among the first predetermined code (preamble code) of five hundred and seventy-six bits. In particular, the initial period T0 of the battery saving signal BS shown in FIG. 5B is sufficient to increase the amplitude of the reference voltage across capacitor C1 in the waveform-shaping circuit 210*b* when the power is turned on, from zero volts to V2 as shown in FIG. 5D. If the switch controller 240*d* produces, in step 280, the battery saving signal BS and quick charging signal QC with respective periods T0 and T2 shown in FIGS. 5B and 5C, the RF receiving circuit 210*a* and the waveform-shaping circuit 210*b* are operated in response to input periods of the battery saving signal BS and quick charging signal QC to supply a received signal having the code format shown in FIG. 4 to the controlling unit 240.

Preamble detector 240*a* and synchronization code detector 240*b* respectively detect the first predetermined code (preamble signal) and the second predetermined code (synchronization code SC) of thirty-two bits among the received signal indicated in FIG. 4 to supply detected codes to switch controller 240*d*. In this case, the switch controller 240*d* checks, in step 282, whether the preamble code or synchronization code SC is detected. If neither the preamble code nor the synchronization code SC is detected in step 282, the battery saving signal BS and quick charging signal QC with periods T1 and T2 are supplied to RF receiving circuit 210*a* and the waveform-shaping circuit 210*b* in step 284. At this time, the battery saving signal BS and quick charging signal QC maintain a low state during the period T1 and a high state during the period T2. Subsequently, the preamble code is periodically checked, in step 286, to sec if it has been detected. If the preamble code has not been detected, step 286 returns to step 284 to continue the battery saving operational mode with step 284 by supplying the battery saving signal BS and the quick charging signal QC with low voltage amplitudes during period T1 and high voltage amplitudes during period T2, while periodically checking in step 286 whether the preamble code has been detected among broadcast signals received via antenna 200. In other words, a first operating state begins by supplying the power to the RF receiving circuit 210*a* and the waveform-shaping circuit 210*b* only during the period for detecting the first and second predetermined codes among the transmission code shown in FIG. 4. Therefore, if the main power is initially turned on, the charging circuit (e.g., a capacitor C1) in the waveform-shaping circuit 210*b* is charged between V2 and V1, and in response to the operation of the battery saving signal BS and quick charging signal QC, it is charged and discharged as shown in FIG. 5D. Usually, in FIG. 5D, the on and off periods arc selected as follows:

$$T0 \geqq T2,\ T1 >> T2. \quad (1)$$

Figures 6A, 6B, 6C, 6D:
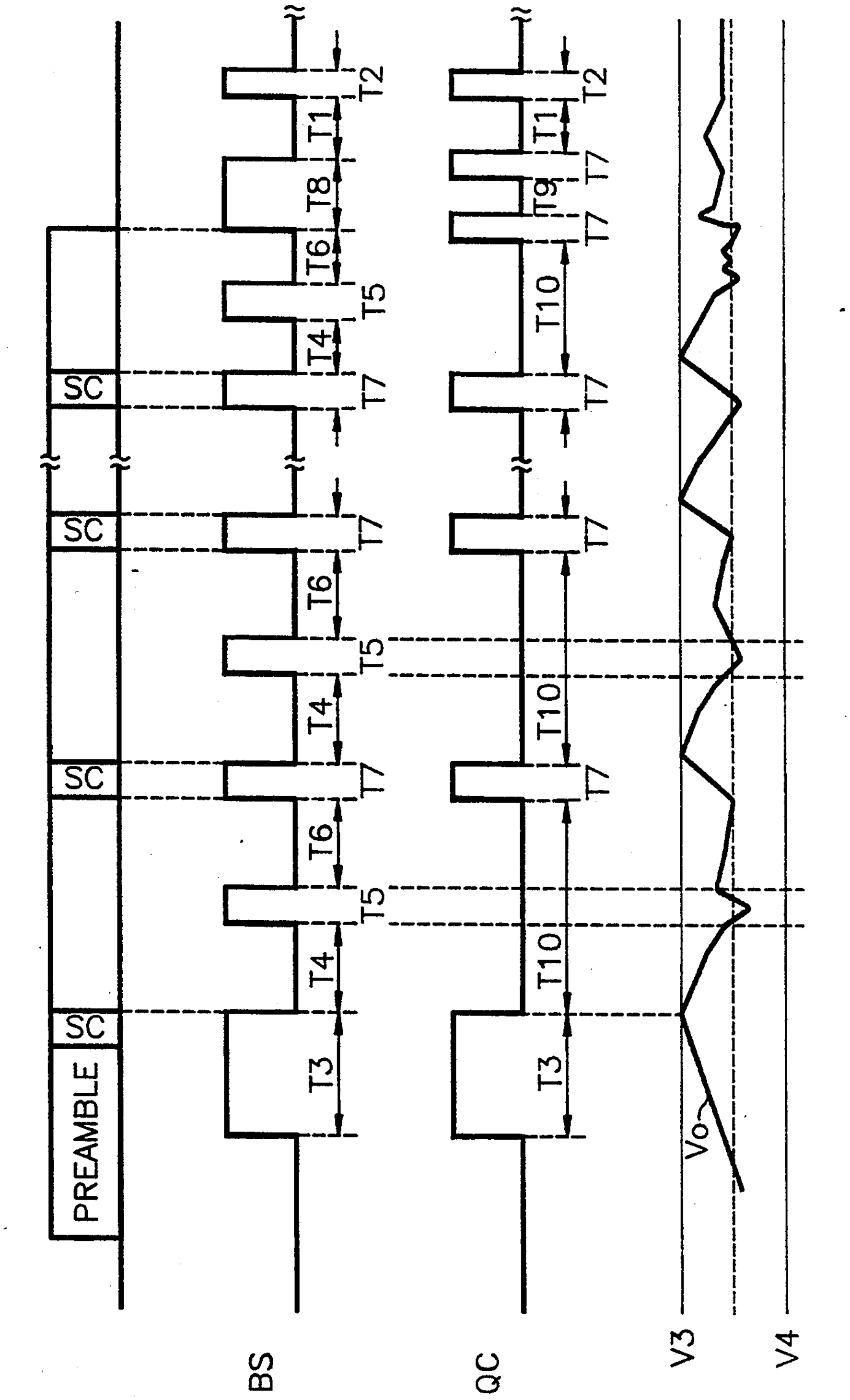
FIGS. 6A through 6D are operational waveforms of a second operational state characteristic of a first embodiment of the present invention.

If the preamble code is detected by the preamble detector 240*a* during the period T2 shown in FIGS. 5B and 5C, the switch controller 240*d* produces, in step 288, the battery saving signal BS and quick charging signal QC both with periods of T3 as shown in FIGS. 6B and 6C, and the receiving unit 210 is turned on until the synchronization code SC is detected. Next, the switch controller 240*d* checks, in step 300, whether or not the synchronization code SC is detected through the SC detector 240*b*. If the synchronization code SC is detected in step 300, the battery saving signal BS and quick charging signal QC repeat low and high states with the periods T4, T5, T6 and T7, and with the periods T10 and T7, respectively as shown in FIGS. 6B and 6C, thereby minimizing power consumption and receiving only necessary data. Next, in step 304, a check is made to see whether the synchronization code SC is detected or not. The lengths of the low voltage amplitude periods T4, T6 and the high voltage amplitude periods T5, T7 are determined by the CAP code in memory 260 of FIG. 3. In this case, the self-identification frame (third predetermined code) with an identification address, among the eight frames in each batch, is detected during the periods T4, T5 and T6 in response to the CAP code in memory 260. If the synchronization code SC is not detected within the period T7, the receiving unit 210 is turned on during the period T8 to detect a subsequently received code, and if the preamble code or the synchronization code SC is not detected during the period T8, the battery saving signal BS and quick charging signal QC maintain high and low states as shown in FIGS. 5B and 5C. Therefore, when either the preamble code or synchronization code SC is detected, an output operating state of the quick charging signal QC is shown in FIG. 6C. That is, the quick charging signal QC is disabled when the battery saving signal BS is enabled during the period T5 after detecting the synchronization code SC, but the quick charging signal QC is operated only during the high voltage amplitude period T7. As a result, the risk of introducing errors by successive data bits of "1" or "0" may be reduced, and when a long batch is connected to a single preamble, the variation rate of the reference voltage Vo is minimized.

FIG. 6D shows the state of variation of the amplitude of reference voltage Vo in response to the battery saving signal BS and quick charging signal QC, and it will be readily appreciated that the drop in amplitude of reference voltage Vo during the period T5 is restored during the charging period T7. That is, in the operation for detecting the preamble code by periodically switching the receiving unit, the quick charging signal QC is identical to the battery saving signal BS, and if the preamble code is detected, the quick charging signal QC is disabled in the self frame, so that the risk that an error will be generated when data bits of "1" or "0" arc successively received, is reduced. Furthermore, by turning on quick charging signal QC at the anticipated occurrence of every SC code, the variation of the reference voltage when a long data batch is received is decreased, so that the ratio of an error generation is reduced.

As described above, since the variation of the reference voltage Vo for waveform-shaping can be minimized through a quick charge control system, in the case that a long data batch is received, the risk of introduction of error can be reduced, thereby improving the reliability of the paging receiver.

The operation of quick charge control according to a second embodiment of the present invention will now be described, in detail, with reference to FIGS. 3 and 8A to 9.

Turning now to FIG. 9, step 400 through step 408 are identical to step 272 to step 286 of FIG. 7. If a preamble code over twelve bits is detected during the time period T2 shown in FIGS. 5B and 5C in step 408, the battery saving signal BS maintains a high state during the period T3, as shown in FIG. 8B, until the synchronization code SC is detected, and the quick charging signal QC maintains a high state during the period T3 as shown in FIG. 8C, in step 410. Next, in step 412, a judgement is made to sec if the synchronization code SC has been detected. If the synchronization code SC has been detected, the battery saving signal BS repeats low voltage amplitude states during periods T4, T6, and high voltage amplitude states during periods T5, T7 as is shown in FIG. 8B. That is, the battery saving signal BS has a high state with a period of thirty-two bits before the self-identification data frame (third predetermined code), and frame data for each successive is processed during the period T5, thereby enabling driver 250 to display data and operate the buzzer or vibrator, etc. During this time, the quick charging signal QC maintains a low voltage amplitude state over the period T9, as is shown in FIG. 8C. In other words, since the quick charging signal QC maintains a low state after the preamble signal is detected, the reference voltage Vo of the waveform-shaping circuit 210*b* has the same value as an intermediate voltage of the output signal of the low pass filter in the waveform-shaping circuit 210*b*, thereby preventing the loss of data while reducing power consumption. In step 416, a check is made to see if a synchronization code SC is detected. If the synchronization code SC is not detected, the receiving unit 210 is turned on during the period T8 to detect a subsequently received code, and if the preamble code or the synchronization code SC is not detected during the period T8, the battery saving signal BS and quick charging signal QC maintain high and low states as shown in FIGS. 5B and 5C. In this case, the reference voltage Vo of the waveform-shaping circuit 210*b* is charged to the voltage V3 during the period T3 and discharged. After the preamble code has been detected, since the capacitor C1 is charged and discharged in response to the battery saving signal BS until all messages are received, the reference voltage Vo is equal to the output voltage of the low pass filter.

Consequently, in the embodiment of FIG. 9, after detecting the preamble code, the quick charge is not implemented and batch data is processed. If only the preamble code is detected and no self-identification data is detected, the quick charging signal QC is synchronized with the battery saving signal BS.

As described above, in the embodiment of FIG. 9, since the reference voltage for waveform-shaping is identical to the output voltage of the low pass filter, by performing the quick charge only while the preamble code is being detected, even if specific data is received, the data can be easily detected. Furthermore, the loss and error of data can be prevented regardless of the transmission speed or the number of data batches, and power consumption is minimized.

While preferred embodiments of the invention have been particularly shown and described, it will be understood by those skilled in the art that the foregoing and other changes in form and details may be made without departing from the spirit and scope of the present invention.

What is claimed is:

1. A quick charging control circuit of a receiver comprising:

power supply means for supplying a voltage of a given level;

radio frequency receiver means for demodulating a received signal into a baseband signal in response to a battery saving signal;

waveform-shaping means for making a comparison of said baseband signal with a reference voltage in response to said battery saving signal to generate a waveform-shaped signal;

quick charging means for charging said waveform-shaping means to said reference voltage in response to a quick charge signal;

first predetermined code detector means and second predetermined code detector means powered by said power supply means, for respectively providing first and second output signals by respectively detecting a first predetermined code and a second predetermined code among said waveform-shaped signal;

data processor means powered by said power supply means, for processing a third predetermined code among said waveform-shaped signal; and switch controller means for simultaneously enabling transmission of said battery saving signal and said quick charge signal during periods of a first operational state to enable detection of said first predetermined code and said second predetermined code, and for selectively enabling transmission of said battery saving signal and said quick charge signal during periods of a second operational state to enable detection of a third predetermined code in response to said first and second output signals, said battery saving signal and said quick charge signal being simultaneously transmitted during said periods of said second operational state corresponding to an anticipated reception of said second predetermined code, said battery saving signal being transmitted while transmission of said quick charge signal is disabled during said periods of said second operational state corresponding to reception of a self-identification frame of said third predetermined code.

2. A quick charging control circuit as claimed in claim 1, further comprised of said periods of said first operating state enabling and disenabling said battery saving signal and said quick charge signal to accommodate detection of data bits of selected areas of said first predetermined code and second predetermined code.

3. A quick charge control circuit as claimed in claim 1, further comprised of said periods of said second operating state enabling and disenabling said battery saving signal and said quick charge signal to accommodate detection of data bits of a selected area of said second predetermined code and bit data of said self-identification frame.

4. A quick charge control circuit as claimed in claim 2, further comprised of said periods of said second operating state enabling and disenabling said battery saving signal and said quick charge signal to accommodate detection of data bits of a selected area of said second predetermined code and bit data of said self-identification frame.

5. A quick charge control circuit as claimed in claim 3, wherein said first predetermined code, second predetermined code and third predetermined code are preamble code, synchronization code, and batch data components, respectively of said baseband signal.

6. The quick charge control circuit of claim 1, comprised of said switch controller means further comprising switching said battery saving signal and said quick charging signal between a first voltage amplitude during a first of said periods of said first operating state and a second and greater voltage amplitude during a second of said periods of said first operating state, said first of said periods being greater than said second of said periods.

7. The quick charge control circuit of claim 1, comprised of said switch controller means further comprising:

switching said battery saving signal in a sequence of a first voltage amplitude during a first of said periods of said second operating state, a second voltage amplitude during a second of said periods of said second operating state, a third voltage amplitude during a third of said periods of said second operating state, and a fourth voltage amplitude during a fourth of said periods of said second operating state, said second and fourth voltage amplitudes being greater than said first and third voltage amplitudes, said first of said periods being greater than said second of said periods, and said third of said periods being greater than said fourth of said periods.

8. The quick charge control circuit of claim 1, comprised of said switch controller means further comprising:

switching said battery saving signal in a sequence of a first voltage amplitude during a first of said periods of said second operating state, a second voltage amplitude during a second of said periods of said second operating state, a third voltage amplitude during a third of said periods of said second operating state, and fourth voltage amplitude during a fourth of said periods of said second operating state, said second and fourth voltage amplitudes being greater than said first and third voltage amplitudes, said first of said periods being greater than said second of said periods, and said third of said periods being greater than said fourth of said periods; and switching said quick charging signal between a fifth voltage amplitude during a fifth of said periods of said first operational state and a sixth voltage amplitude during a sixth of said periods of said first operational state, said fifth of said periods being greater than said sixth of said periods, and said sixth voltage amplitude being greater than said fifth voltage amplitude.

9. The quick circuit of claim 1, comprised of said switch controller means further comprising:

switching said battery saving signal and said quick charging signal between a first voltage amplitude during a first of said periods of said first operating state and a second and greater voltage amplitude during a second of said periods of said first operating state, said first of said periods being greater than said second of said periods;

switching said battery saving signal in a sequence of a third voltage amplitude during a first of said periods of said second operating state, a fourth voltage amplitude during a second of said periods of said second operating state, a fifth voltage amplitude during a third of said periods of said second operating state, and a sixth voltage amplitude during a fourth of said periods of said second operating state, said fourth and sixth voltage amplitudes being greater than said third and fifth voltage amplitudes, said first of said periods of said second operating state being greater than said second of said periods, and said third of said periods of said second operating state being greater than said fourth of said periods; and switching said quick charging signal between a seventh voltage amplitude during a fifth of said periods of said second operational state and an eighth voltage amplitude during a sixth of said periods of said second operational state, said fifth of said periods being greater than said sixth of said periods, and said eighth voltage amplitude being greater than said seventh voltage amplitude.

10. The quick charge control circuit of claim 1, comprised of said switch controller means further comprising:

switching said battery saving signal in a sequence of a first voltage amplitude during a first of said periods of said second operating state, a second voltage amplitude during a second of said periods of said second operating state, a third voltage amplitude during a third of said periods of said second operating state, and a fourth voltage amplitude during a fourth of said periods of said second operating state, said second and fourth voltage amplitudes being greater than said first and third voltage amplitudes, said first of said periods being greater than said second of said periods, and said third of said periods being greater than said fourth of said periods; and maintaining said quick charging signal at a fifth voltage amplitude during said detecting of said first predetermined code and said second predetermined code, and at a sixth voltage amplitude during said detecting of said third predetermined code, said fifth voltage amplitude being greater than said sixth voltage amplitude.

11. The quick circuit of claim 1, comprised of said switch controller means further comprising:

switching said battery saving signal and said quick charging signal between a first voltage amplitude during a first of said periods of said first operating state and a second and greater voltage amplitude during a second of said periods of said first operating state, said first of said periods being greater than said second of said periods;

switching said battery saving signal in a sequence of a third voltage amplitude during a first of said periods of said second operating state, a fourth voltage amplitude during a second of said periods of said second operating state, a fifth voltage amplitude during a third of said periods of said second operating state, and a sixth voltage amplitude during a fourth of said periods of said second operating state, said fourth and sixth voltage amplitudes being greater than said third and fifth voltage amplitudes, said first of said periods of said second operating state being greater than said second of said periods, and said third of said periods of said second operating state being greater than said fourth of said periods; and maintaining said quick charging signal at a seventh voltage amplitude during said detecting of said first predetermined code and said second predetermined code, and at an eighth voltage amplitude during said detecting of said third predetermined code, said seventh voltage amplitude being greater than said eighth voltage amplitude.

12. A quick charging control process for a receiver comprising power supply means for supplying a voltage of a given amplitude, receiver means for demodulating and waveform-shaping a received signal in response to a battery saving signal and a quick charge signal, and switch controller means for generating said battery saving signal and said quick charge signal in accordance with periods of a first operational state to enable detection of first and second predetermined codes, and for generating said battery saving signal and said quick charge signal in accordance with periods of a second operational state to enable detection of a third predetermined code in response to said detection of said first predetermined code and said second predetermined code, said process sequentially comprising the steps of:

performing a first detection step by enabling generation of said battery saving signal and said quick charge signal during first and second periods respectively of said first operational state to enable detection of said first predetermined code and said second predetermined code when power is supplied, and determining whether one of said first predetermined code and said second predetermined code is detected;

disabling and enabling generation of both said battery saving signal and said quick charge signal during a third period and said second period respectively of said first operational state when neither said first predetermined code nor said second predetermined code is detected during said first detection step, and periodically determining whether said first predetermined code is detected by repeating said steps of disabling and enabling generation of both said battery saving signal and said quick charge signal during said third and second periods of said first operational state, respectively, until said first predetermined code is detected;

enabling generation of both said battery saving signal and said quick charge signal during a fourth period of said first operational state after said first predetermined code is detected, said battery saving and quick charge signals being generated during said fourth period of said first operational state until said second predetermined code is detected;

performing a second detection step by enabling generation of said battery saving signal during a first period of said second operational state in order to detect a self-identification frame of said third predetermined code, then enabling generation of both said battery saving and quick charge signals during a second period of said second operational state corresponding to an anticipated detection of a subsequent second predetermined code; and repeating said second detection step after said subsequent second predetermined code is detected, continuing to repeat said second detection step until successive transmissions of said second predetermined code are no longer detected, and then returning to said first detection step.

13. A quick charging control method of a paging receiver comprising power supply means for supplying a voltage of a given amplitude, receiver means for demodulating and waveform-shaping a received signal in response to a battery saving signal and a quick charge signal, and a switch controller means for switching said battery saving signal and said quick charge signal in accordance with periods of a first operating state to detect first and second predetermined codes, and for switching said battery saving signal and said quick charge signal in accordance with periods of a second operating state to detect a third predetermined code in response to said detection of said first predetermined code and said second predetermined code, said method sequentially comprising the steps of:

performing a first detection step by enabling generation of said battery saving signal and said quick charge signal during first and second periods, respectively, to enable detection of said first predetermined code and said second predetermined code when power is supplied, and then checking whether said first predetermined code and said second predetermined code are detected;

disabling and enabling generation of both said battery saving signal and said quick charge signal during a third period and said second period, respectively, when neither said first predetermined code nor said second predetermined code is detected during said first detection step, and then periodically determining whether said first predetermined code is detected by repeating said steps of disabling and enabling generation of both said battery saving signal and said quick charge signal during said third and second periods, respectively, until said first predetermined code is detected;

enabling generation of both said quick charge signal and said battery saving signal during a fourth period after said first predetermined code is detected, said battery saving and quick signals being generated during said fourth period until said second predetermined code is detected;

performing a second detection step by enabling generation of said battery saving signal while generation of said quick charge signal is disabled during a fifth period in order to detect a self-identification frame of said third predetermined code, then enabling generation of said battery saving signal while generation of said quick charge signal is disabled during a sixth period corresponding to an anticipated detection of a subsequent second predetermined code; and repeating said second detection step when said subsequent second predetermined code is detected, continuing to repeat said second detection step until successive transmissions of said second predetermined code are no longer detected, and then returning to said first detection step.

14. The quick charging control process as claimed in claim 12, wherein said first predetermined code, said second predetermined code and said third predetermined code are a preamble code, a synchronization code, and batch data components, respectively of said baseband signal.

15. The quick charging control method as claimed in claim 13, wherein said first predetermined code, said second predetermined code and said third predetermined code are a preamble code, a synchronization code, and batch data components, respectively of said baseband signal.

* * * * *

UNITED STATES PATENT AND TRADEMARK OFFICE

CERTIFICATE OF CORRECTION

PATENT NO. 5,410,734
DATED 25 April 1995
INVENTOR(S) Jin-Ho Choi

It is certified that error appears in the above-indentified patent and that said Letters Patent is hereby corrected as shown below:

Column 5, Line33, change "120b" to --210b--:

Signed and Sealed this

Twenty-ninth Day of July, 1997

Attest:

BRUCE LEHMAN

*Attesting Officer* *Commissioner of Patents and Trademarks*